United States Patent [19]

Akagi et al.

[11] Patent Number: 5,157,055

[45] Date of Patent: Oct. 20, 1992

[54] CATION EXCHANGE POLYIMIDE RESIN AND USE THEREOF

[75] Inventors: Yoshiro Akagi, Osaka; Koji Ohoka, Nara; Shigeru Kaminishi, Nara; Hiroshi Taniguchi, Nara; Hideo Asahina; Hirotaka Ohno, both of Tenri; Mariko Ishino, Nara; Atsuhisa Inoue, Nara; Yasunari Okamoto, Nara; Yoshiharu Nakajima, Nara, all of Japan

[73] Assignee: Sharp Kabushiki Kaisha, Osaka, Japan

[21] Appl. No.: 711,272

[22] Filed: Jun. 4, 1991

Related U.S. Application Data

[63] Continuation of Ser. No. 238,847, Aug. 31, 1988, abandoned.

[30] Foreign Application Priority Data

Aug. 31, 1987 [JP] Japan ............... 62-218687

[51] Int. Cl.$^5$ .................... C08J 5/20; C08J 5/22
[52] U.S. Cl. ..................... 521/25; 210/660; 210/661; 210/681; 521/26; 521/27; 521/32; 525/420; 525/424; 525/436; 528/353
[58] Field of Search ......................... 210/660

[56] References Cited

U.S. PATENT DOCUMENTS 3,410,826  11/1968  Endrey .................. 528/23
3,771,966  11/1973  Hutson .................. 422/132

Primary Examiner—Joseph L. Schofer
Assistant Examiner—Fred Zitomer
Attorney, Agent, or Firm—Birch, Stewart, Kolasch & Birch

[57] ABSTRACT

A cation exchange polyimide resin having resistance to organic solvents which contains polyamidocarboxylic acid units providing sites of ion exchange and represented by the formula (I):

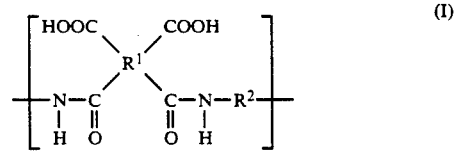

wherein $R^1$ is a tetravalent organic group, and $R^2$ is a bivalent organic group, which is capable of trapping cations from organic solvents.

5 Claims, 3 Drawing Sheets

CATION EXCHANGE POLYIMIDE RESIN AND USE THEREOF

This application is a continuation of U.S. patent application Ser. No. 07/238,847 filed on Aug. 31, 1988 now abandoned.

BACKGROUND OF THE INVENTION

1. Field of the Invention

The present invention relates to cation exchange resins, and more particularly to cation exchange resins which are capable of trapping alkali metal ions from organic solvents and suited for use in organic solvent purifying apparatus or the like, and also to the use of the resins.

2. Description of the Prior Art

Inorganic absorbents such as activated carbon, silica gel, activated alumina and synthetic zeolite have long been used in the chemical industry, food industry, petroleum industry, etc. for purifying gases or liquids and for trapping traces of components. Especially with the use of diversified production processes of increased complexities, development of various new processes and innovations in production techniques in recent years, sophisticated methods of purifying materials are required for manufacturing products of improved qualities, so that the adsorption purification technique is resorted to in various fields. The adsorption purification method is based on the principle of trapping molecules of gases such as air and radioactive waste gases, or of liquids such as water or other liquids in fine pores of the inorganic adsorbent of specified size. However, the inorganic adsorbents heretofore used originally contain large amounts of alkali metals and are therefore limited in use because of the difficulty encountered in avoiding contamination with alkali metal ions although having high ability to adsorb water gases.

Porous polymers have been developed in recent years as adsorbents free of the drawback of these inorganic adsorbents. Typical of such organic porous polymers are polystyrene resins prepared by suspension (emulsion) polymerization and easily controllable in particle size and pore size. These resins are widely used for liquid chromatography utilizing their characteristics.

On the other hand, the purification method of adsorbing ions with an ion exchange resin employs an insoluble porous film of synthetic resin serving as a kind of adsorbent and having an ion group with ion exchange ability. When this method is used for cation exchange, the synthetic resin employed is a high polymer acid having an acidic group introduced therein and removes cations from aqueous solutions. Examples of useful synthetic resins are typically ion exchange celluloses and chemically coupled porous polymers. The ion exchange celluloses comprise a cellulose resin having an ion exchange group, e.g. $-CH_2CH_2N^+(C_2H_5)_2$, $-CH_2CH_2N^+(C_2H_5)_3$, $-CH_2COO^-$, $-CH_2CH_2SO_3^-$ or $-PO(OH)^-O$, attached thereto through ether linkage and thereby given an ion exchange capacity.

Although the aforementioned porous polymer is merely a copolymer of styrene, divinylbenzene or the like and is nonpolar, the chemically coupled porous polymers include those comprising styrene having sulfonic acid or like acidic group introduced therein and thereby made polar (extra issue of Chemical Industry, Plant Operation Series, "Adsorption," pp. 143-163(1971), published by Kagaku Kogyo Co., Ltd.), and acrylic ester, acrylamide and like polymers having intermediate polarity imparted thereto. Such chemically coupled porous polymers having medium to strong polarity are known to act on the substances to be removed, selectively in response to delicate differences in polarity, and are generally used in the field of fine chemicals for isolating metabolites, enzymes, proteins, etc., in the field of petrochemicals for example for separating aliphatic hydrocarbons from aromatic hydrocarbons, in the field of waste water treatment for efficiently removing phenol, chlorophenol, alkylbenzenesulfonates, etc. and in other fields.

Nevertheless, the aforementioned porous polymer is substantially easily soluble in organic solvents and has the drawback of being usable for water and dilute aqueous solutions only.

Of the ion exchange resins, the ion exchange cellulose has the problem of being soluble in organic solvents due to the presence of its ion exchange group although the skeletal cellulose resin thereof is generally sparingly soluble in usual solvents such as water, alcohols and ethers.

The chemically coupled porous polymer similarly has the problem of being usable only in aqueous solutions because of low resistance to organic solvents.

Thus, the adsorbents described are all low in resistance to organic solvents, are therefore difficult to use for removing impurities from organic solvents by adsorption and are not usable for purifying organic solvents.

The present invention, which has been accomplished in view of the foregoing situation, provides an adsorbent capable of stably adsorbing metal ions, especially alkali metal ions, from various organic solvents by ion exchange without dissolving or swelling therein, and also a method of purifying organic solvents with use of the adsorbent.

From the above viewpoint, we have directed attention to polyimide resins which are chemically stable and carried out intensive research thereon.

In recent years, polyimide resins have attracted attention as resins having very high chemical stability. Especially, aromatic polyimides are thought most promising because of their high heat resistance. The polymide has a tough structure obtained, for example, by subjecting an aromatic tetrabasic carboxylic acid dianhydride and a primary diamine to a condensation cyclization reaction as represented by the following formula.

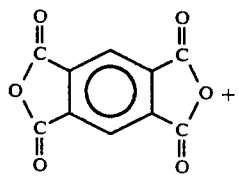

Aromatic carboxylic acid dianhydride

-continued

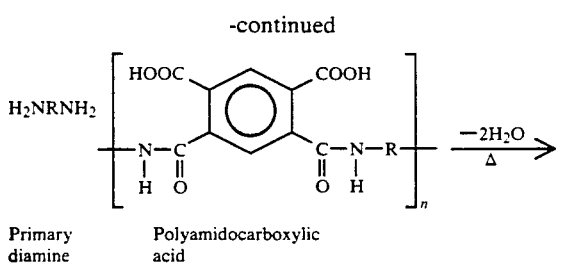

Primary diamine

Polyamidocarboxylic acid

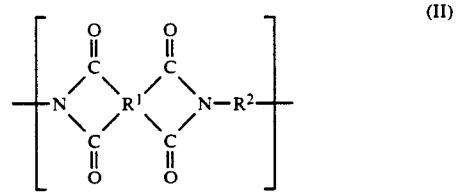

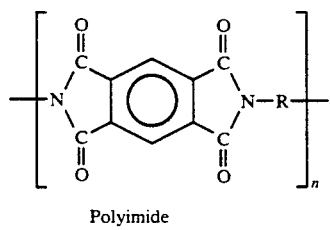

Polyimide

There is a tendency to use polyimide resins of higher condensation degree and higher imidation degree which have improved resistance to heat, chemicals, ozone and radiation. Especially, polyimide resins of high condensation degree are obtained by heating a polyamidocarboxylic acid, precursor thereof, at a temperature of at least 300° C. for a long period of time to subject the carboxylic acid groups and the amido groups to condensation cyclization substantially completely.

In view of the fact that the condensation degree is controllable by varying the heating temperature or heating time, we conducted investigations based on the idea that a polyimide resin obtained at a reduced degree of condensation and having polyamidocarboxylic acid (polyamic acid) units partially remaining therein will be useful as an ion exchange material because of their carboxyl groups. Consequently, we have found that such a polyimide resin irreversibly adsorbs and removes mobile cations from organic solvents through ion exchange with good stability, and further that the resin, like usual ion exchange resins, can be readily regenerated with dilute hydrochloric acid or dilute sulfuric acid.

Although conventional polyimide resins include those subjected incompletely to condensation cyclization, for example, for the adjustment of viscosity in forming coatings, these resins are used only for simple structural materials as heat-resistant insulating varnishes or the like, and nothing whatever is known as to the use of such resins as ion exchange materials or adsorbents.

SUMMARY OF THE INVENTION

Accordingly, the present invention provides a cation exchange polyimide resin having resistance to organic solvents which comprises a polyamidocarboxylic acid unit providing sites of ion exchange and represented by the formula (I):

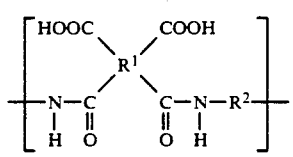

wherein $R^1$ is a tetravalent organic group, and $R^2$ is a bivalent organic group, and a polyimide unit of the formula (II):

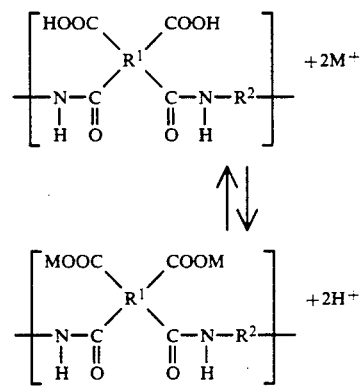

wherein $R^1$ and $R^2$ are the same meanings as defined above.

The present invention further provides a method of purifying an organic solvent containing cations, such as alkali metal ions, comprising contacting the organic solvent with the cation exchange polyimide resin.

The polyamidocarboxylic acid units present in the cation exchange polyimide resin of the invention capture or trap various metal ions in media, especially in organic solvents, by the action of the carboxyl groups thereof, for example, according to the following equation:

wherein $M^+$ is a metal ion. The trapped metal ions can be easily released into an acid solution. The polyimide unit acts to permit the resin to retain its shape stably and solvent resistance in its entirety.

On the principle of ion exchange, the cation exchange polyimide resin of the present invention stably traps various cations that can be present in organic solvents. Especially with organic solvents in prevalent use in the field of electronics and semiconductors as well as in the conventional field of chemicals, these solvents need to have a higher purity to meet the requirements as to the improved qualities of end products and the minuteness of their structures. The invention makes it possible to provide highly reliable and highly efficient ion exchange adsorbents thus required and having very high usefulness.

DESCRIPTION OF THE PREFERRED EMBODIMENT

Figure 1:
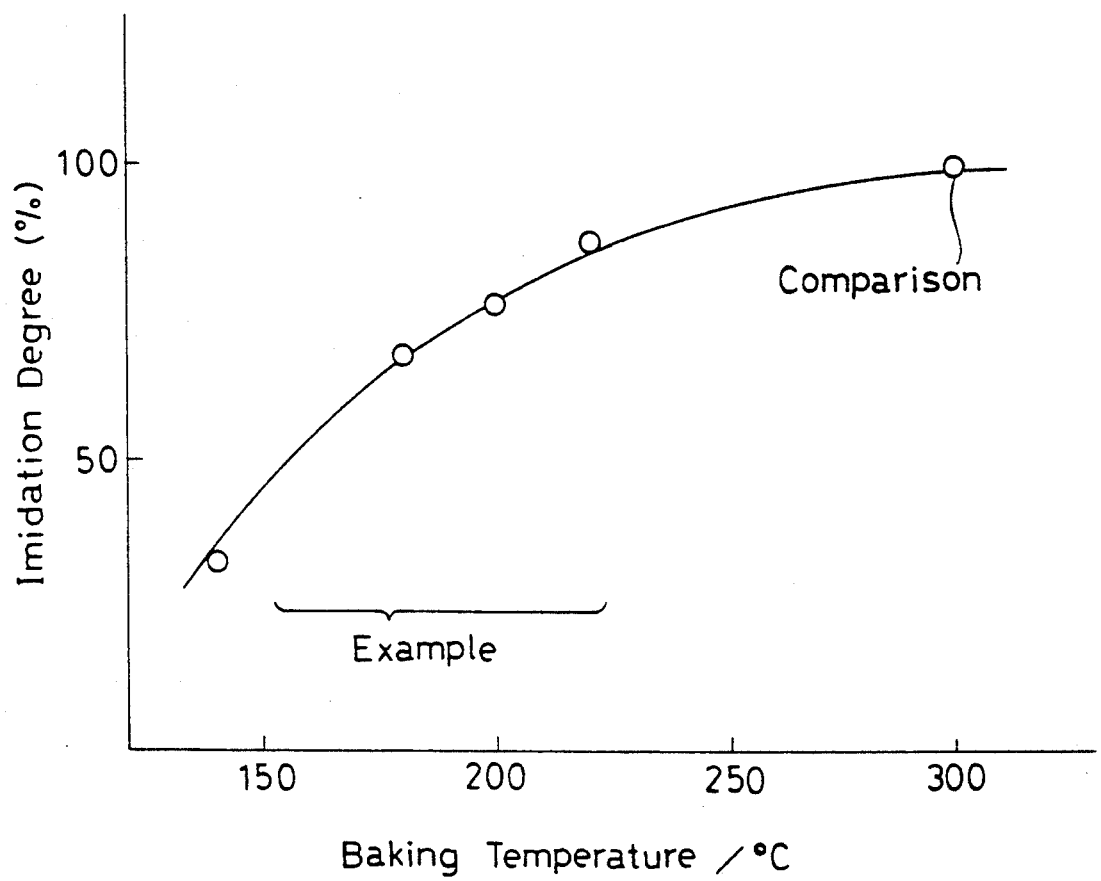
FIG. 1 is a graph showing the relationship between the heating temperature and the imidation degree involved in the production of ion exchange polyimide resins of the invention and a comparative resin.

The group $R^1$ in the polyamidocarboxylic acid unit (I) of the present invention is one of various tetravalent organic groups, suitable examples of which are aryl group represented by the formulae:

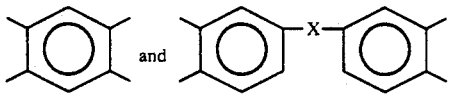

wherein X is —$CH_2$—, —$C(CH_3)_2$—, —O—, —CO—, —CO—O—CO— or —$C(CF_3)_2$—. The group $R^2$ is one of various bivalent organic groups, suitable examples of which are diphenyl-type groups represented by the formula:

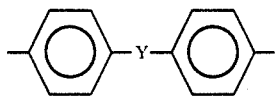

wherein Y is —$CH_2$, —$SO_2$—, —$C(CH_3)_2$—, —$C(CF_3)_2$— or —O—.

The ion exchange polyimide resin of the present invention can be prepared by dissolving approximately equimolar amounts of a tetracarboxylic acid dianhydride and a diamine in a polar solvent, reacting the solution at a temperature of about 20 to about 100° C. for about 30 minutes to about 4 hours to obtain a solution of polyamidocarboxylic acid (polyamic acid, usually having a number average molecular weight of ca. 5000–50000), and heating the solution, for example as applied to a substrate by coating or spreading, at a high temperature to remove the solvent and subject the polyamidocarboxylic acid to incomplete condensation cyclization.

For this reaction, it is required to control the heating temperature and time so as not to completely subject the polyamidocarboxylic acid units to condensation cyclization, permitting some of the units to remain as such in the reaction mixture. With usual polyimide resins, the amidocarboxylic acid, when heated for example at a temperature of at least 300° C. for about 2 hours, substantially completely undergoes condensation cyclization and is thereby imidated, so that the heating time at such a temperature must be controlled to less than 2 hours. With consideration given not only to the ion exchange ability but also to the shape retentivity and solvent resistance of the resulting resin, it is suitable to control the heating temperature and time so that about 2 to about 98% of the amidocarboxylic acid to be subjected to condensation cyclization will be so reacted. Thus, an imidation degree (the ratio of the unit of the formula (II) to the total units of the formula (I)+(II)) is suitably 2 to 98%, preferably 5 to 75%, and more preferably 10 to 50%.

Suitable tetracarboxylic acid anhydrides for preparing the present resin are aromatic tetrabasic carboxylic acid dianhydrides, which include, for example, pyromellitic acid dianhydrides, and anhydrides of derivatives of phthalic acid or trimellitic acid represented by the formula:

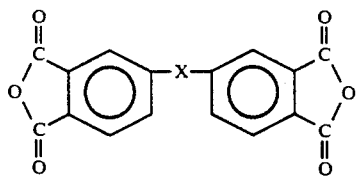

wherein X is —$CH_2$—, —$C(CH_3)_2$—, —O—, —CO—, —CO—O—CO— or —$C(CF_3)_2$—.

On the other hand, suitable diamines are aromatic diamines, such as diphenylamine derivatives represented by the formula:

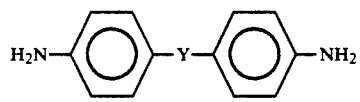

wherein Y is $CH_2$, —$SO_2$—, —$C(CH_3)_2$—, —$C(CF_3)_2$— or —O—.

Other examples of the diamines are diaminodiloxanes represented by the formula:

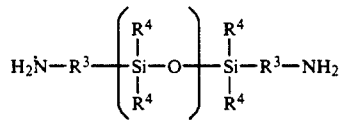

wherein $R^3$ is lower alkylene group having 1–5 carbon atoms or phenyl group, $R^4$ is methyl or phenyl groups and n is an integer from 1 to 4.

Examples of polar solvents for use in preparing the precurser, i.e. polyamidocarboxylic acid, are dimethylacetamide, N-methylcaprolactam, N-methylpyrrolidone and the like.

The polyimide resin of the invention thus prepared may be in the form of a film, sheet, particles or fibers. Fibers may be spun into a threadlike material. In whatever form, the present resin exhibits ion exchange ability or ion adsorbing ability with good stability when brought into contact with various organic solvents.

Accordingly, the present resin functions as an adsorbent for adsorbing or removing very small amounts of alkali metal ions, for example, from lower alcohols, acetone, trichloroethylene, ethers, dioxane, cellosolve, cyclohexane, cyclohexanone, petroleum ether, toluene, nitroethane, pyridine, chloroform, carbon disulfide, ethane dichloride, ethylene trichloride, ethane fluoride, ethylene fluoride, etc. and also for adsorbing, removing or controlling the concentration of a wide variety of common cations. Especially when brought into contact with these organic solvents (immersed therein or exposed to flows thereof) for a given period of time, the resin stably traps impurity cations that can be present and is therefore advantageously usable for purifying such organic solvents.

EXAMPLE 1

1,2,4,5-Benzenetetracarboxylic anhydride serving as a tetracarboxylic anhydride and 4-aminophenyl ether serving as a diamine were dissolved, each in an amount of 0.001 mole, in 5 ml of a polar solvent (dimethylacetamide) and maintained at 100° C. for 30 minutes to obtain a solution of polyamidocarboxylic acid. A high-resistance silicon substrate (>1kΩ-cm) was uniformly coated with the solution by the spinner method and then heated at a predetermined baking temperature (140° C., 180° C., 200° C., 220° C. or 300° C.) for about 1 hour by which a polyimide resin film (about 0.1 μm in thickness) having the imidation degree of 32%, 67%, 76%, 87% or 100% was formed. The relationship between the imidation degree and the heating temperature is as shown in FIG. 1. (The imidation degree was calculated from the measurement obtained by FT-IR of ratio between the infrared absorption intensities at the frequencies of 1780 cm$^{-1}$ and 1500 cm$^{-1}$.)

The illustrated result indicates that a polyimide resin having a low imidation degree and having polyamidocarboxylic acid units significantly remaining therein can be obtained by controlling the baking temperature to less than 300° C., preferably to not higher than 250° C.

EXAMPLE 2

The same materials as in Example 1 were treated to obtain a polyimide resin film having the imidation degree of 45%, 60%, 75%, 90% or 95%.

Figure 2:
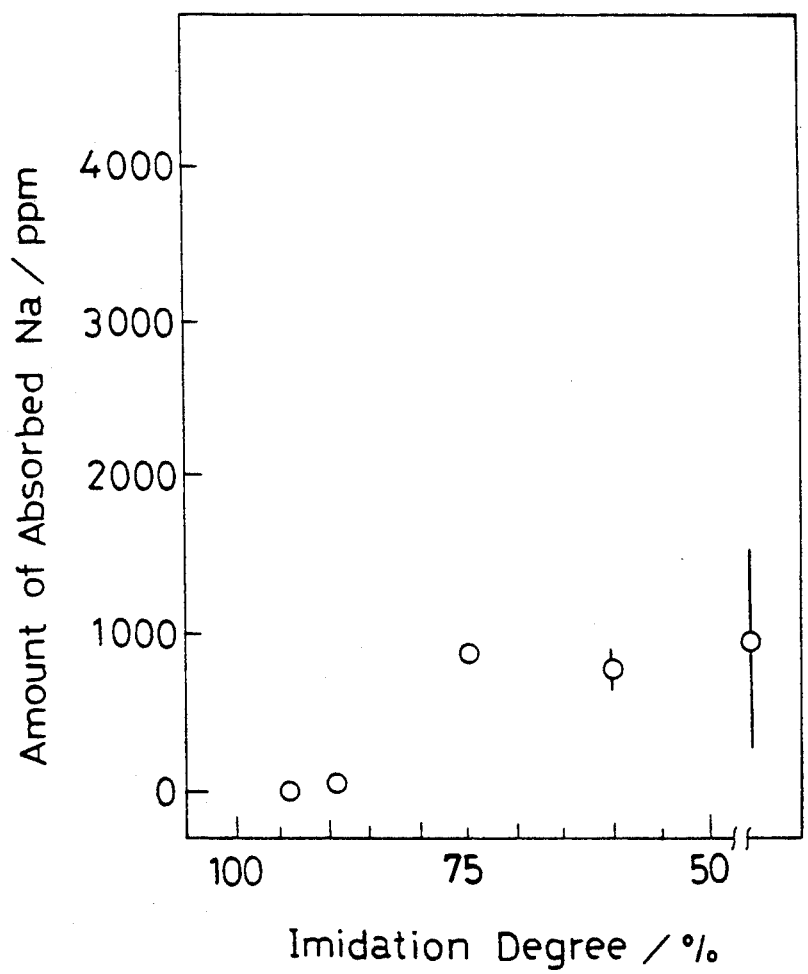
FIG. 2 is a graph showing the relationship between the imidation degree of the same resins and the amount of sodium absorbed thereby.

Each polyimide resin film was immersed for a specified period of time in isopropyl alcohol having sodium ions dissolved therein at a predetermined concentration, and the sodium ion concentration of the alcohol was measured after the film was withdrawn. The amount of sodium adsorbed by the polyimide resin per unit weight was calculated from the decrease in the concentration. FIG. 2 shows the result.

Thus, there is an apparent correlation between the amount of adsorbed sodium ions and the imidation degree of the polyimide. This indicates that the polyamic acid, which is the unbaked residue of the polyimide, preferentially functions as a cation exchange group.

When similarly tested for the adsorption of potassium ions which are other alkali metal, the present resin produced the same effect as on sodium ions.

Figure 3:
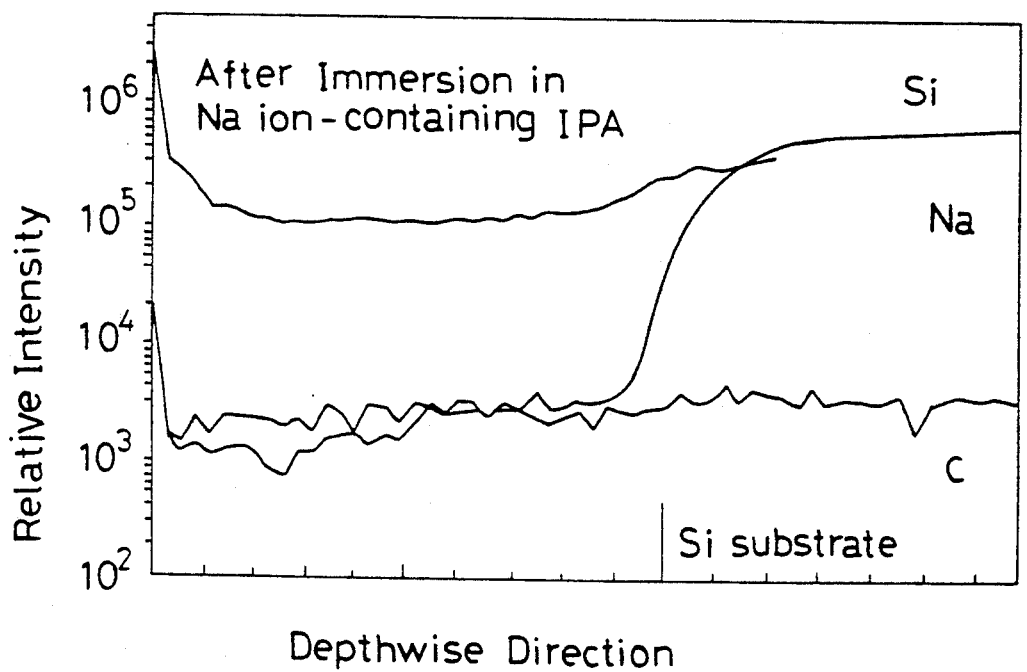
FIG. 3 is a graph showing the distribution of sodium ions adsorbed by the ion exchange polyimide resin of the invention as determined depthwise of a film thereof from its surface.

FIG. 3 shows the depthwise distribution of sodium ions adsorbed by the polyimide resin film of the invention as determined by an ion microanalyzer after the above measurement.

The diagram shows that the sodium is distributed substantially uniformly depthwise from the film surface. This reveals that the thin polyimide film effectively functions in its entirety as an adsorbent.

EXAMPLE 3

Example 1 was repeated under heating at baking temperature of 230° C., 182° C., 145° C. or 120° C. for 1 hour, to obtain a polyimide resin film of the imidation degree of 90%, 70%, 36% or 13%, respectively.

Each of the resulting films on silicon substrates was immersed in acetone and measured on IR adsorption intensity thereof at time elapses of 3, 9 and 13 days. No change in quality of the test film is observed.

EXAMPLES 4-6

Instead of 4-aminophenyl ether, the following diamine was used and treated in a similar way to Example 1, excepting that the three different baking temperatures of 100° C., 150° C. and 200° C. were adopted.

Example No.

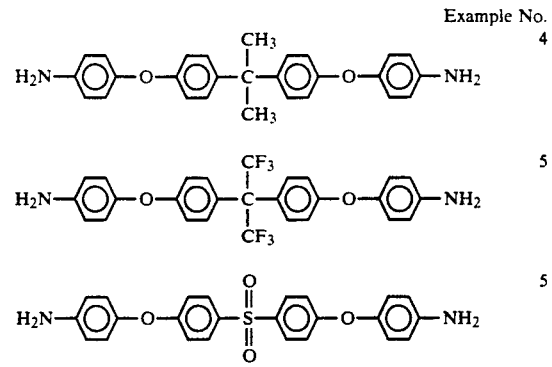

All of the resulting polyimide resin films showed to be usable as ion exchange resins by subjecting to the same text as described in Example 2.

EXAMPLE 20

Instead of 4-aminophenyl ether, the following diamine was used and treated in a similar way to Example 1.

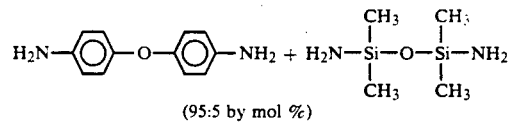

(95:5 by mol %)

All of the resulting polyimide resin films showed to be usable as ion exchange resins by subjecting to the same text as described in Example 2.

Although thin films of polyimide resin were used in the present example for simplified experiments, comparable results can of course be achieved using an assembly of such films, fibers of the resin as spun with use of a solvent and suitable means, or an assembly of such fibers. Like other ion exchange resins, the polyimide resin film of the invention having adsorbed cations can be regenerated with approximately 1N hydrochloric acid, sulfuric acid or like solution.

What is claimed is:

1. A cation exchange system which comprises a cation exchange polyimide resin having resistance to organic solvents which comprises a polyamidocarboxylic acid unit providing sites of ion exchange and represented by the formula (I):

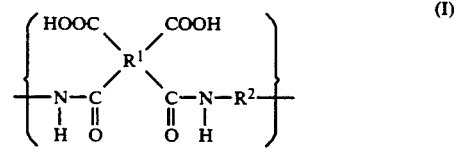

wherein R$^1$ is an aryl group represented by the formula:

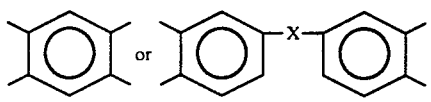

wherein X is —CH$_2$—, —C(CH$_3$)$_2$—, —O—, —CO—, —CO—O—CO— or C(CF$_3$)$_2$— and R$^2$ is a diphenyl-type group represented by the formula:

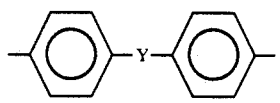

wherein Y is —CH$_2$, —SO$_2$—, —C(CH$_3$)$_2$—, —C(CF$_3$)$_2$— or —O— and a polyimide unit of the formula (II):

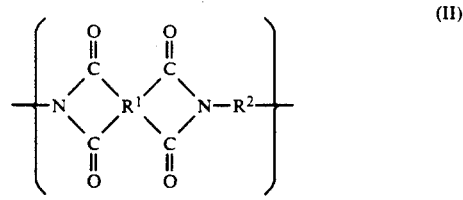

wherein R$^1$ and R$^2$ are the same meanings as defined above;
an organic solvent; and
a metal cation, wherein said cation exchange polyimide resin is dispersed and substantially insoluble in said organic solvent and said metal cation is dissolved in said organic solvent.

2. The cation exchange system of claim 1, wherein said cation is an alkali metal ion.

3. The cation exchange system of claim 1, wherein said organic solvent is selected from the group consisting of lower a alcohol, acetone, trichloroethylene, ether, dioxane, cellosolve, cyclohexane, cyclohexanone, petroleum ether, toluene, nitroethane, pyridine, chloroform, carbon disulfide, ethane dichloride, ethylene trichloride, ethane fluoride and ethylene fluoride.

4. The cation exchange system of claim 3, wherein said cation is an alkali metal ion.

5. The cation exchange system of claim 1, wherein said cation exchange polyimide resin is in the form of a film, a sheet, particles or fibers.

* * * * *